March 7, 1950     R. CHELMINSKI     2,499,460
SEDIMENT MOVING BLADE

Filed April 26, 1947     2 Sheets-Sheet 1

INVENTOR.
Roman Chelminski.
BY Blair Curtis & Hayward
Att'y.

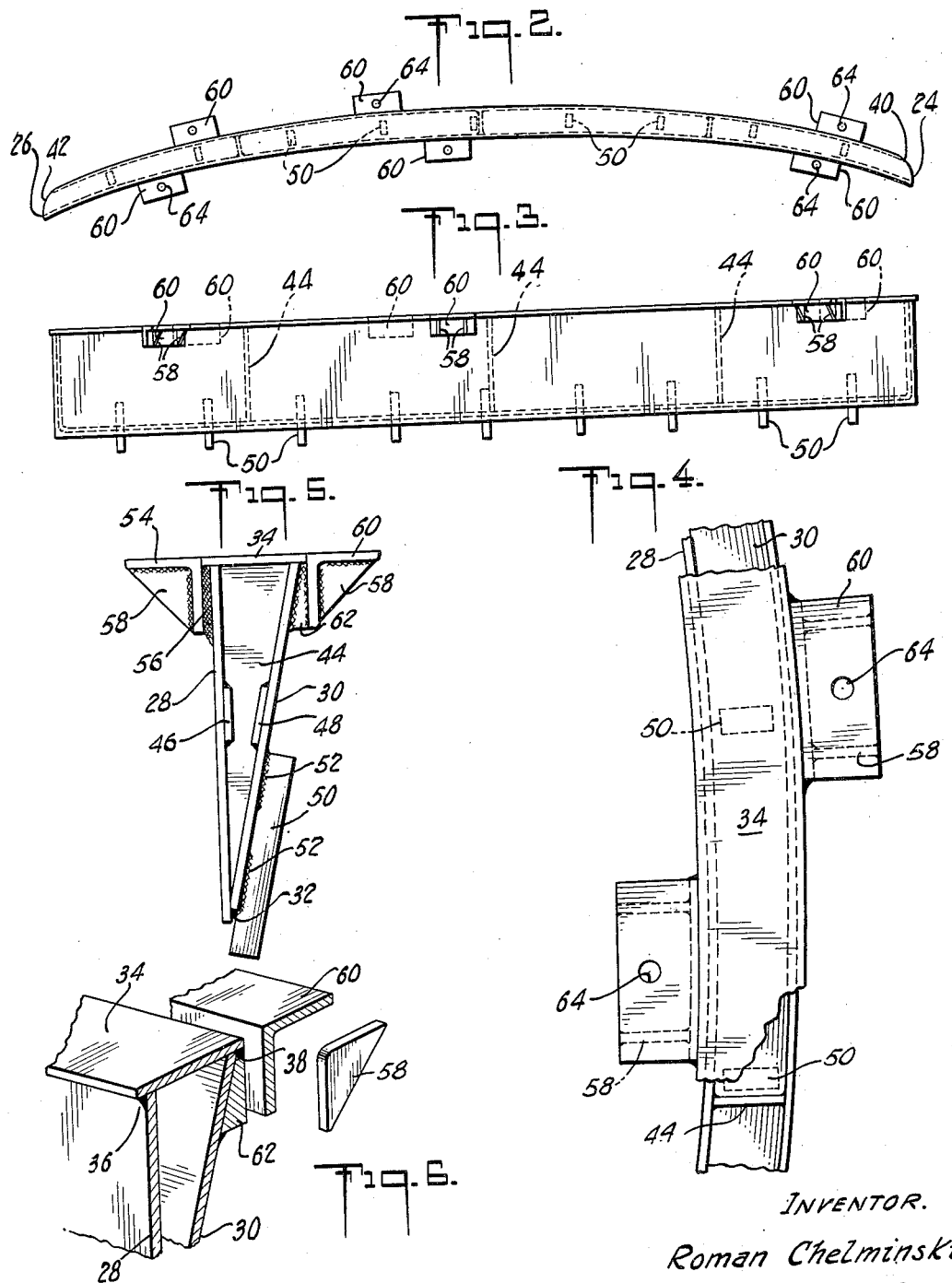

Patented Mar. 7, 1950

2,499,460

UNITED STATES PATENT OFFICE 2,499,460

SEDIMENT MOVING BLADE

Roman Chelminski, Wilton, Conn., assignor to General American Transportation Company, Chicago, Ill.

Application April 26, 1947, Serial No. 744,046

7 Claims. (Cl. 210—55)

This invention relates to sedimentation apparatus of the type known commercially as hydroseparators or thickeners. More particularly, the invention relates to improved blades for use on the rake or scraper arms of such sedimentation apparatus.

Sedimentation apparatus of the type to which the invention is particularly directed comprises usually a large circular tank having a bottom sloping toward a discharge cone at the center, the water separated from the sludge overflowing the outer rim of the tank into a circumferential launder and the sludge or other sediment being moved by the rake or scraper blades toward the discharge cone. In such apparatus it is, of course, customary to introduce the sewage or other material to be subjected to hydroseparation into the tank near its discharge cone so that the heavier portions of the sludge settle immediately into the discharge cone and only the dispersed solids are carried by the liquid flow toward the outer rim of the tank. Occasionally, however, sudden surges of input may cause heavier materials to be carried along by the rapid flow of the liquid toward the outer rim of the tank and thus be deposited upon the tank bottom in the paths of travel of the outer parts of the rake or scraper arms.

Although in normal operation the burden put upon the rake or scraper blades in gradually moving the sedimented silt toward the discharge cone is not very severe, it will be obvious that, at times, and particularly with sudden surges of input into the sedimentation apparatus, the burden will be markedly increased. In apparatus of the type to which the present invention is particularly intended to be applied, this problem is mainly met by temporarily lifting the blade-carrying arms when the torque reaction becomes too great. It is, however, also important that the blades themselves be of such a construction that each is substantially self-supporting and of a strength to resist all loads put upon it and that in their movement through the liquid the blades do not unnecessarily agitate the liquid and thus tend to maintain the solids, which would otherwise settle to the bottom, in suspension.

Attempts have been made heretofore to form these blades simply from single plates of sheet steel but the blades thus formed have not had sufficient inherent strength and rigidity to meet the burden put upon them and it has, therefore, been necessary to interconnect the blades in such manner that each blade contributes to the support of the adjacent blades in the performance of their tasks. Such interconnection of the blades in apparatus of this type is objectionable, however, because it results in the phenomenon known in the trade as "island formation"; that is, the material which the blades were intended to move toward the discharge cone packed instead between the blades and thus was not moved as it should have been to the point of discharge.

A general object of the present invention is to provide an improved blade construction for the rake or scraper arms of sedimentation apparatus of the type hereinabove referred to which is of such inherent strength that no interconnection of the blades below the supporting arms is required and that the blades are thus both self-supporting and self-cleaning.

A further object of the invention is to provide a blade of such overall contour that, in its movement through the liquid, it will effect a minimum of disturbance thereof and thus not interfere with the sedimentation of the liquid-borne solids.

Other objects, important features and advantages of the invention, to which reference has not been made hereinabove, will appear hereinafter when the following description and claims are considered in connection with the accompanying drawings, in which—

Figure 2 is a top plan view of an improved blade embodying the present invention;

Figure 3 is a front elevation of the blade shown in Figure 2;

Figure 4 is a detail plan of a portion of the top of one of the blades with parts of the top plate broken away to show the interior construction;

Figure 5 is a section on the line 5—5 of Figure 2, and

Figure 6 is an exploded view showing the elements going to make up one of the blade-attaching brackets.

Figure 1:
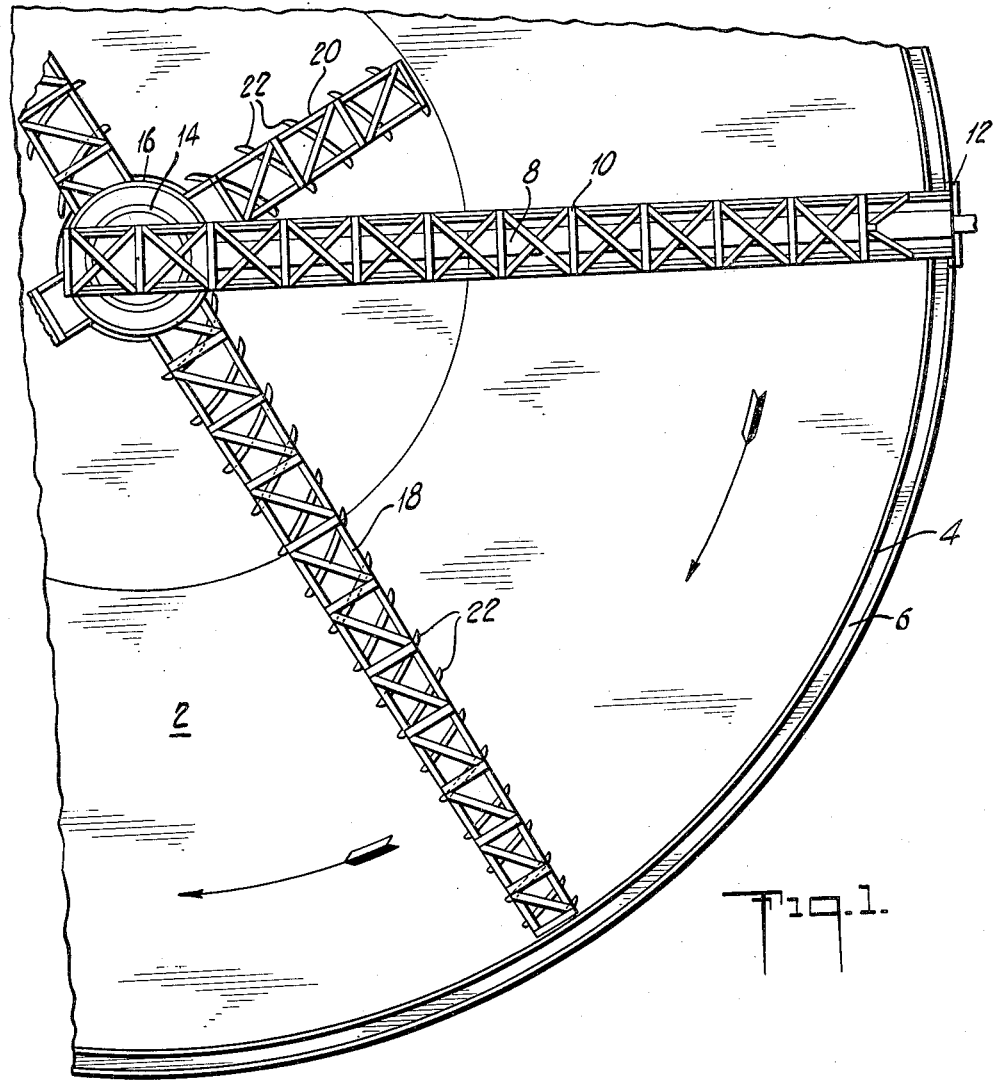
Figure 1 is a fragmentary plan of a sedimentation apparatus of the type to which the invention is particularly applicable.

In Figure 1 of the drawings, which shows a fragmentary plan of sedimentation apparatus of the type to which the invention may be applied, a circular tank 2, having an inclined bottom leading to a central discharge cone not specifically shown, has a rim 4 over which the water from which the solids have largely been precipitated upon the bottom of the tank flows into a launder 6 leading to a common water discharge, also not shown. The sewage or other material to be hydroseparated is introduced into the tank 2 through an intake pipe 8 which, as shown, discharges the sewage into the tank near the central discharge cone in order to permit the heavier solids in it to precipitate themselves at once near the point of ultimate discharge. The constant addition of liquid to the center of the tank, of course, causes a gradual flow of liquid toward the rim 4 and over the edge of the rim into the launder 6, the liquid gradually dropping its solids as it moves slowly from the central intake point to the periphery of the tank over a constantly increasing surface area.

The intake pipe 8 is supported on a truss frame 10 extending from any suitable support 12 outside the tank to the pier 14 at the center of the tank. A rotary drum or frame 16, driven from suitable mechanism, not shown, which is mounted upon the pier 14, has attached to it long scraper carrying arms 18 and shorter scraper carrying arms 20, the long arms being provided with rake or scraper blades 22 from the drum to the periphery of the tank and the short arms 20 being provided with blades 22 to their outer ends, but only over the more steeply sloped parts of the tank bottom.

It will be seen that the blades 22 are inclined to the radius of rotation at a suitable angle, say about 30°, to insure gradual movement of the silt or sediment engaged by them toward the discharge cone at the center of the tank, as the arms 18 and 20 are rotated about the axis of rotation of the drum 16. It will also be seen that the trailing edge of each blade 22, starting from the outer end of each arm 18 or 20, radially overlaps the leading edge of the succeeding blade whereby each succeeding blade picks up the silt or sediment moved into its field of operation by the next outwardly located blade.

Although the angle of inclination of the blades 22 to the radius of rotation of the blades about the center of the drum 16 is comparatively slight, nevertheless, it will be apparent that each of these blades may be called upon to do considerable work and that this work may vary considerably with the rate of input of the material to be hydroseparated and therefore the rate of flow of the liquid borne solids from the central part of the tank toward the rim thereof. Loads put upon these arms by sudden surges are compensated for by raising the drum 16 with its attached arms by automatically actuated hydraulic mechanism more fully described in the co-pending application of Roman Chelminski et al., Serial No. 588,278, April 14, 1945. It is important, however, as hereinabove pointed out, so to construct the blades 22 that they will withstand the strains put upon them without having so to interconnect them as to interfere with their proper functions. To this end, as more fully shown in Figures 2 to 6 inclusive, the improved blades of the present invention, instead of being constructed from single plates of sheet steel, requiring interconnection of the blades to insure proper stiffness, are formed as self-supporting units, each so designed as to perform effectively its intended function without excessive disturbance of the liquid through which it moves.

The illustrated improved blade is curved as shown in Figure 2 from its leading end 24 to its discharge end 26 and is formed of front and rear plates 28 and 30, respectively, so inclined to each other as to meet at or near the lower edges where they are secured together by a watertight weld 32, the front plate 28 being preferably so incorporated in the supported blade structure that it is substantially normal to the bottom of the tank 2. A top plate 34 spans the upper edges of the front and rear plates 28 and 30 and is secured thereto by watertight welds 36 and 38. These plates are curved as shown in Figure 2 before being welded together and the ends of the rear plate 30 are curved in at 40 and 42 to meet the front plate 28 at or near the ends thereof and are welded thereto in watertight relation. Water is thus completely excluded from the interior of the blade construction, which is an important advantage, but not essential to the invention.

As shown particularly in Figures 2, 5 and 6 of the drawings, the front plate 28 is a cylindrical segment and the back plate 30 is a conic segment so that the lower edges of the plates will meet along their entire length and a desired junction of the lower edges of the plates may be made at 32. Similarly, the curved ends 40 and 42 of back plate 30 are conic segments of smaller radius than the main portion of the back plate to provide a desired junction with front plate 28.

To reinforce and stiffen the blade so that it will be substantially self-supporting, transverse stiffener plates 44 are located between the front and rear plates, these stiffener plates serving also as spacer plates and being of a shape, as shown in sectional view, Figure 5, to fit snugly between the front and rear plates for a substantial part of the height from the welded lower edge to the top plates. The stiffener plates 44 are welded to the front and rear plates, as shown at 46 and 48.

It is preferable that the lower edges of the blade do not ride or touch directly on the bottom of the tank 2, since the frictional drag would be considerable, and therefore leg bars 50, projecting slightly below each blade and suitably spaced along the length thereof, are welded thereto, the illustrated leg bars being welded to the rear plate 30, as shown at 52.

In order to provide for attachment of the blades to the arms 18 and 20, each is preferably provided with suitable attaching brackets properly spaced to provide for bolting to parts of the skeleton framework of each arm 18 or 20. The front brackets 54, which may be made of a section of angle iron, may have one side welded directly to the front plate 28, as shown at 56, in such position that the other side is flush with the upper face of the top plate 34, the angle section being reinforced, if desired, by triangular pieces 58 welded in position as shown in Figure 5. In order to connect the rear bracket 60 to the inclined rear plate 30 in such position that its top surface is flush with the top surface of the top plate 34, gusset pieces 62 may be welded between the vertical side of the bracket 60 and the rear plate 30, each gusset piece 62 being welded both to the rear plate 30 and to the bracket 60. These brackets 54 and 60 may be provided with bolt holes 64 by which the brackets and thus the blades may be firmly secured to the arms 18 and 20.

From the foregoing description it will be seen that the blade construction thus provided is inherently strong not only by reason of the manner in which the two curved front and rear plates are connected directly to each other and also through the top plate 34, but that the strength inherent in this construction is enhanced by the use of the stiffener and spacer plates 44, positively secured to the front and rear plates 28 and 30. It will further be seen that the means for securing the blades to the arms 18 and 20 is such as to brace them against any strains to which they might be subjected in operation. In fact it has been found in operation that no other support than that provided in the blade construction itself is required to hold it securely and rigidly in position for all of the tasks that it is called upon to perform.

It will further be seen that by reason of the tapering curved ends 40 and 42 on the blades they are given a substantial streamline contour which facilitates their travel through the water without substantial disturbance thereof. In other words, the streamlining avoids the setting up of vortices or eddies behind the blades as they move through the water.

Moreover, it will be noted that the smooth uninterrupted front surface provided by the front plate 28 on each blade insures the desired smooth gradual movement of the silt or sediment from the outer reaches of the arms toward the discharge cone, with no opportunity for "island formation" between the blades, since the operative face of each is completely uninterrupted.

It will further be noted that the spacing of the upper edges of the front and rear plates is greatest at a point substantially intermediate between the ends thereof and diminishes toward each end. It will also be noted that the curvature of the front plate 28 is on a substantially uniform radius throughout its length and that the curvature of the rear plate 30 at its ends is abruptly reduced to a short radius to permit the edges of the rear plate to meet the edges of the front plate.

An idea of the dimensions of the blades may be gathered from the fact that sedimentation apparatus of the type in which the invention is particularly useful, is of relatively large dimensions, the tank diameter frequently being as much as 150 feet. In such an apparatus the blades 22 nearest the center of the apparatus might have a chord length of about 10 feet and a blade depth from top to bottom of from about 15-30 inches, these dimensions tapering off to an outer blade having a chord length of about 9 feet and a blade depth from top to bottom of approximately 1 to 2 feet.

What is claimed as new is:

1. A sediment moving blade for use on the rake or scraper arms of sedimentation apparatus and adapted to be supported on said arms in angular relation to the direction of movement of said arms to move sediment toward the center of said apparatus, said blade being an elongated hollow structure and comprising a first elongated plate curved with respect to its long dimension, a second elongated plate curved with respect to its long dimension and having a concave surface confronting the convex surface of said first plate, said first and second plates being joined near one of their long edges and being relatively inclined with respect to one another, and a third elongated plate spanning the other long edges of said first and second plates, the ends of said second plate being joined to the ends of said first plate to form a closed structure.

2. A sediment moving blade for use on the rake or scraper arms of sedimentation apparatus and adapted to be supported on said arms in angular relation to the direction of movement of said arms to move sediment toward the center of said apparatus, said blade being an elongated hollow structure and comprising a first elongated plate curved with respect to its long dimension, a second elongated plate curved with respect to its long dimension and having a concave surface confronting the convex surface of said first plate, said first and second plates being joined near one of their long edges and being relatively inclined with respect to one another, at least one of said first and second plates being a conic segment to provide the desired relative inclination between said plates to permit junction of said plates, and a third elongated plate spanning the other long edges of said first and second plate, the ends of said second plate being joined to the ends of said first plate to provide a closed structure.

3. A sediment moving blade for use on the rake or scraper arms of sedimentation apparatus and adapted to be supported on said arms in angular relation to the direction of movement of said arms to move sediment toward the center of said apparatus, said blade being an elongated hollow structure and comprising a first elongated plate curved with respect to its long dimension, a second elongated plate curved with respect to its long dimension and having a concave surface confronting the convex surface of said first plate, said first and second plates being joined near one of their long edges and being relatively inclined with respect to one another, said first plate being a cylindrical segment and said second plate being a conic segment to provide the desired junction between said long edges of said plates, and a third elongated plate spanning the other long edges of said first and second plate, the ends of said second plate being joined to the ends of said first plate to provide a closed structure.

4. A sediment moving blade according to claim 1 and in which transverse stiffening plates are secured between said first and second plates at spaced intervals between the ends thereof.

5. A sediment moving blade according to claim 1 and having leg bars welded to the convex surface of said second plate and projecting below the lower edge of said blade at spaced intervals throughout the length thereof.

6. A sediment moving blade according to claim 1 in which the spacing between said other long edges of said first and second plates is greatest near the center of said blade and becomes less toward the ends of said blade.

7. A sediment moving blade according to claim 3 and wherein the end portions of said second plate are conic segments of smaller radius than the main portion of said second plate to provide a desired junction with the ends of said first plate.

ROMAN CHELMINSKI.

REFERENCES CITED

The following references are of record in the file of this patent:

UNITED STATES PATENTS

| Number | Name | Date |
| --- | --- | --- |
| 1,872,601 | McHale | Aug. 16, 1932 |
| 1,884,426 | Ward | Oct. 25, 1932 |
| 1,923,143 | Gouner | Aug. 22, 1933 |
| 2,101,079 | Lund | Dec. 7, 1937 |
| 2,122,283 | Scott | June 28, 1938 |
| 2,122,285 | Scott | June 28, 1938 |
| 2,215,185 | Lund | Sept. 17, 1940 |
| 2,222,437 | Lykken | Nov. 19, 1940 |
| 2,279,970 | Coe | Apr. 14, 1942 |
| 2,419,262 | Gurries et al. | Apr. 22, 1947 |

Certificate of Correction

Patent No. 2,499,460                                          March 7, 1950

ROMAN CHELMINSKI

It is hereby certified that the above numbered patent was erroneously issued to "General American Transportation Company, of Chicago, Illinois" whereas said patent should have been issued to *General American Transportation Corporation, of Chicago, Illinois, a corporation of New York*, as assignee; and that the said Letters Patent should be read as corrected above, so that the same may conform to the record of the case in the Patent Office.

Signed and sealed this 12th day of December, A. D. 1950.

[SEAL]

THOMAS F. MURPHY,
                                                      *Assistant Commissioner of Patents.*